United States Patent
Sato (10) Patent No.: US 7,287,174 B2
(45) Date of Patent: Oct. 23, 2007

(54) INPUT DEVICE WITH REDUCED DEAD BAND OF AN ANALOG OUTPUT SIGNAL

(75) Inventor: Isao Sato, Fukushima-ken (JP)

(73) Assignee: Alps Electric Co. Ltd., Tokyo (JP)

( * ) Notice: Subject to any disclaimer, the term of this patent is extended or adjusted under 35 U.S.C. 154(b) by 450 days.

(21) Appl. No.: 10/938,443

(22) Filed: Sep. 9, 2004

(65) Prior Publication Data

US 2005/0060592 A1    Mar. 17, 2005

(30) Foreign Application Priority Data

Sep. 12, 2003    (JP)    ............................. 2003-321861

(51) Int. Cl.
  G06F 1/32    (2006.01)
  G01R 27/08   (2006.01)
  G01R 27/26   (2006.01)
(52) U.S. Cl. ........................ 713/320; 324/691; 324/660
(58) Field of Classification Search ................ 713/320; 324/660, 691

See application file for complete search history.

(56) References Cited

U.S. PATENT DOCUMENTS

| 7,064,561 | B2 * | 6/2006 | Morimoto .................... 324/691 |
| 2002/0050918 | A1 | 5/2002 | Furudate et al. |
| 2002/0063241 | A1 * | 5/2002 | Alink et al. ................. 252/390 |
| 2004/0104735 | A1 * | 6/2004 | Morimoto .................... 324/660 |
| 2005/0030281 | A1 * | 2/2005 | Inamura et al. ............. 345/156 |

\* cited by examiner

*Primary Examiner*—Suresh K Suryawanshi
(74) *Attorney, Agent, or Firm*—Brinks Hofer Gilson & Lione (57) ABSTRACT

An input device includes contacts having resistive elements and low-resistance elements opposing the respective resistive elements, an operating unit varying the contact areas between the low-resistance elements and the resistive elements, and detecting means for switching an operation mode of the input device in response to the operation of a supporting leg provided on the operating unit. When the operating unit is not operated, the detecting means switches the operation mode to a sleep mode while the resistive elements and the low-resistance elements are kept in contact with each other. When the operating unit is operated, the detecting means switches the operation mode and the sleep mode is disabled.

5 Claims, 8 Drawing Sheets

INPUT DEVICE WITH REDUCED DEAD BAND OF AN ANALOG OUTPUT SIGNAL

This application claims the benefit of priority to Japanese Patent Application No. 2003-321861 filed on Sep. 12, 2003, herein incorporated by reference.

BACKGROUND OF THE INVENTION

1. Field of the Invention

The present invention relates to an input device capable of enabling and disabling a sleep mode, and in particular, relates to an input device whose operability is not impaired when the sleep mode is disabled.

2. Description of the Related Art

Some input devices for game consoles, personal computers and the like can vary the outputs in an analog fashion in response to the pushing force.

An input device disclosed in Japanese Unexamined Patent Application Publication No. 2002-93274 includes an electrode provided on a substrate and a click rubber member composed of silicone or the like opposing the electrode. Pulsed electricity is supplied to the click rubber member. When a key top is pressed, the click rubber member comes into contact with the electrode to generate an output. When the click rubber member is further pressed to the electrode, the click rubber member is elastically deformed and the output is varied in response to the amount of deformation.

Some input devices can be put into a sleep mode to reduce power consumption when the input devices are left unoperated for a predetermined period.

In order to enable and disable the sleep mode in the above-described input device, the click rubber member needs to be separated from the electrode when the key top is not pressed. The sleep mode is enabled when the click rubber member does not come into contact with the electrode for a predetermined period, and is disabled when the key top is pressed to bring the click rubber member into contact with the electrode. However, this arrangement requires a predetermined pushing force before an output is generated after the key top is pressed. This causes a 'dead zone' which impairs the operability when the arrangement is applied to an input device whose output varies in an analog fashion in response to the pushing force.

Furthermore, since one circuit is used for detecting operations both in the sleep mode and in a normal operation mode, the circuitry and the control are disadvantageously complicated.

SUMMARY OF THE INVENTION

It is an object of the present invention to provide an input device which can reliably disable a sleep mode without impairing the operability and which has simplified circuitry.

The input device according to the present invention preferably includes contacts having resistive elements and low-resistance elements opposing the respective resistive elements, an operating unit varying the contact areas between the low-resistance elements and the resistive elements, and detecting means for switching an operation mode of the input device, without using the contacts, in response to operations of the operating unit. When the operating unit is not operated for a predetermined period, the detecting means preferably switches the operation mode to the sleep mode to reduce power consumption while the low-resistance elements and the respective resistive elements are kept in contact with each other. When the operating unit is operated, the detecting means preferably switches the operation mode and the sleep mode is disabled.

In the above-described invention, the low-resistance elements and the respective resistive elements are kept in contact with each other even when the operating unit is not operated. This arrangement prevents a dead band, and thus the operability is not impaired. Moreover, additional detecting means for disabling the sleep mode can reliably disable the sleep mode. Furthermore, since separate circuits are prepared for detecting operations in the sleep mode and in a normal operation mode, the circuitry can be simplified.

In this case, the input device may include a supporting leg provided on the operating unit. The detecting means can switch the operation mode in response to the operating force of the supporting leg when the operating unit is pressed.

The input device preferably includes elastic pushing units opposing the respective contacts and supporting the operating unit so that the operating unit can be pressed. When the operating unit is pressed, outputs at the contacts vary in response to the compressive deforming force of the elastic pushing units. The supporting leg is preferably composed of a harder material than the elastic pushing units. The supporting leg harder than the elastic pushing units allows the detecting means to switch the operation mode by a small pushing force when the operating unit is pressed.

The resistive elements may be disposed around a virtual axis extending through the center of the supporting leg in two orthogonal directions with a space therebetween, and the operating unit can operate the low-resistance elements opposing the respective resistive elements. Alternatively, the resistive elements may be disposed in one direction with a space therebetween so that the operating unit seesaws thereon.

DESCRIPTION OF THE PREFERRED EMBODIMENTS

Figure 1:
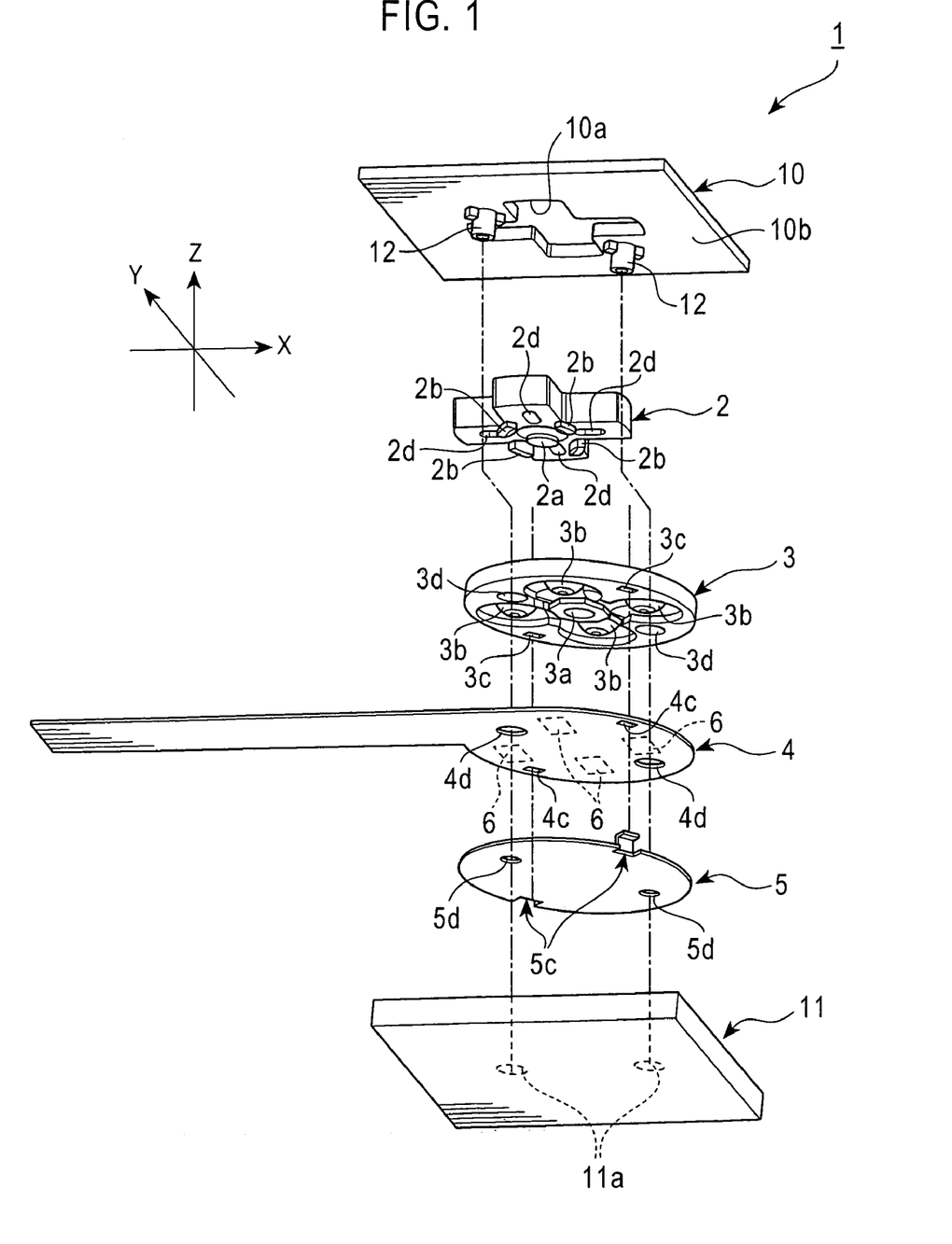
FIG. 1 is an exploded perspective view of an embodiment of the input device according to the present invention.
Figure 2:
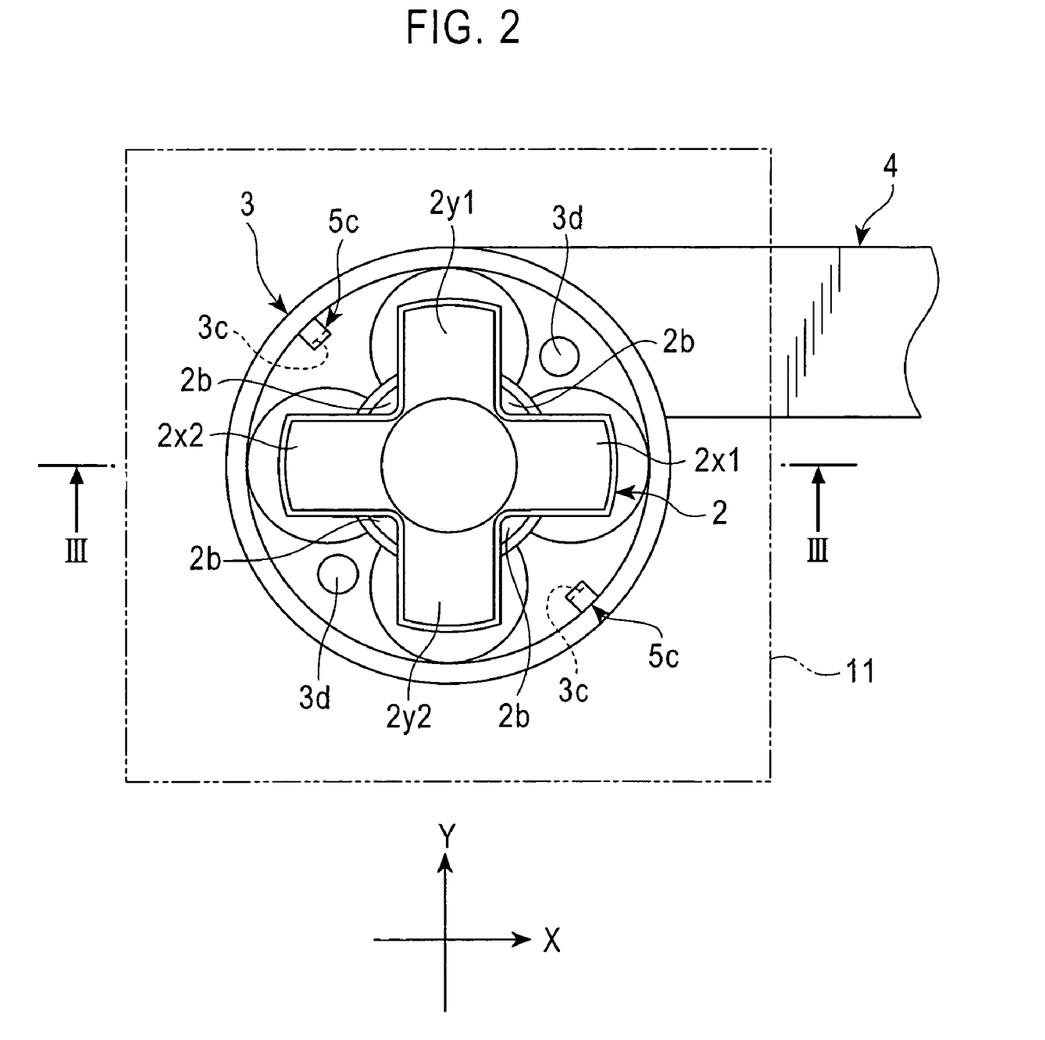
FIG. 2 is a plan view of the input device shown from the operational side.

FIG. 1 is an exploded perspective view of an embodiment of the input device according to the present invention. An input device 1 includes a cross-shaped operating unit 2 composed of synthetic resin or the like and a detecting substrate 4 operated by the operating unit 2. FIG. 2 is a plan view of the input device shown from the operational side. The operating unit 2 has four arms or operating portions $2x1$, $2x2$, $2y1$, and $2y2$ extending in four directions. The operating portions operate respective four contacts 6 provided on the detecting substrate 4.

As shown in FIG. 1, a supporting leg 2a is integrally formed on the operating unit 2 and protrudes from the bottom center of the operating unit 2. An elastic supporting member 3 is provided under the operating unit 2 to support the operating unit 2. The elastic supporting member 3 includes a hole 3a at the center, into which the supporting leg 2a is fitted. Four flanges 2b are integrally formed on the bottom surface of the operating unit 2 around the supporting leg 2a and each extends outward in the radial direction.

Figure 3:
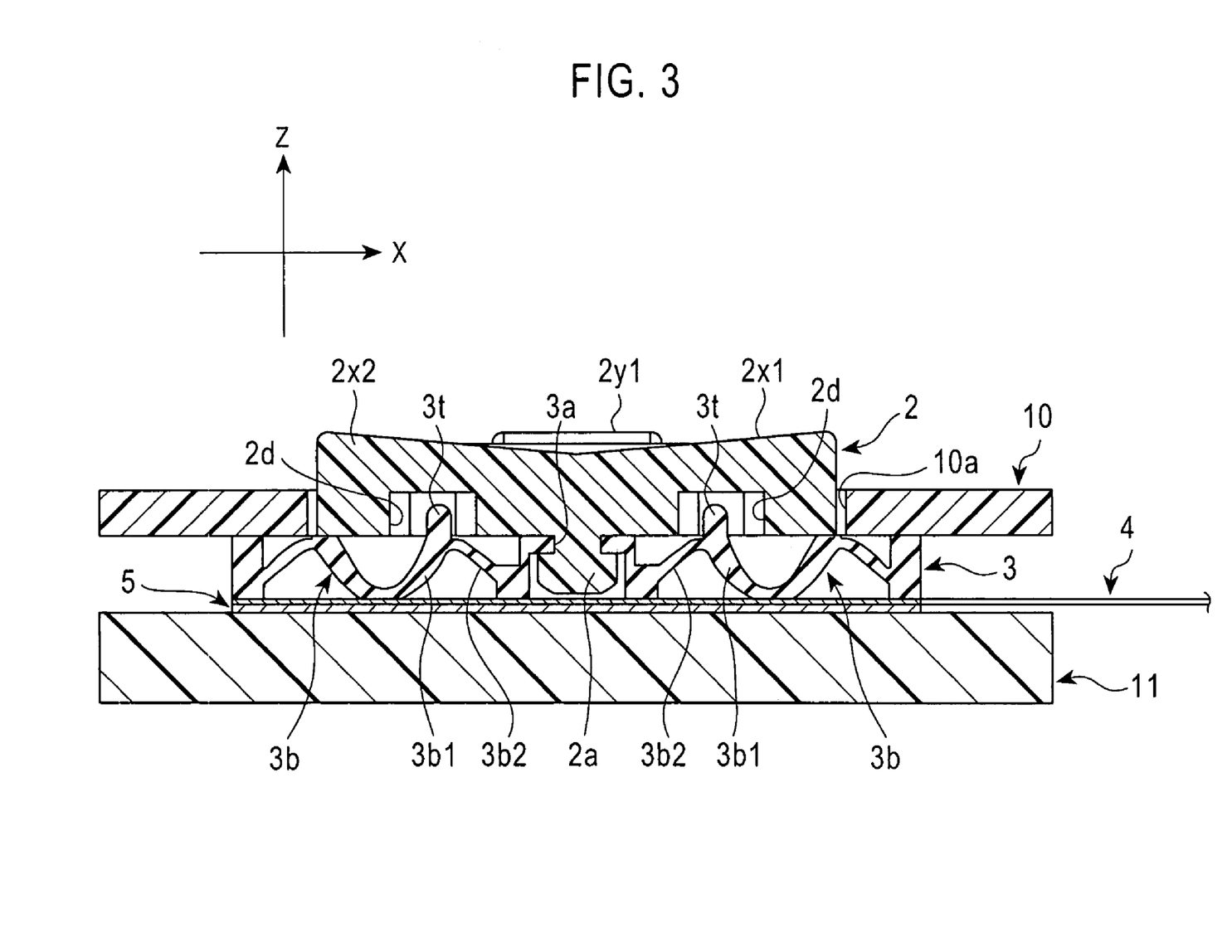
FIG. 3 is a cross-sectional view taken along line III-III in FIG. 2.

The elastic supporting member 3 is composed of an elastically deformable material such as synthetic rubber, and includes four elastic pushing units 3b. The operating portions 2x1, 2x2, 2y1, and 2y2 of the operating unit 2 operate the respective elastic pushing units 3b. FIG. 3 is a cross-sectional view taken along line III-III in FIG. 2. The elastic pushing units 3b are composed of respective pushing portions 3b1, which are deformable by compression, and respective elastically deformable thin ribs 3b2, thus preventing the pushing portions 3b1 from becoming decentered.

The elastic pushing units 3b further include respective protrusions 3t protruding upward at the top. The protrusions 3t are disposed in respective oblong hollows 2d provided on the bottom surfaces of the operating portions 2x1, 2x2, 2y1, and 2y2 to prevent the operating unit 2 from turning on the elastic supporting member 3.

Figure 4:
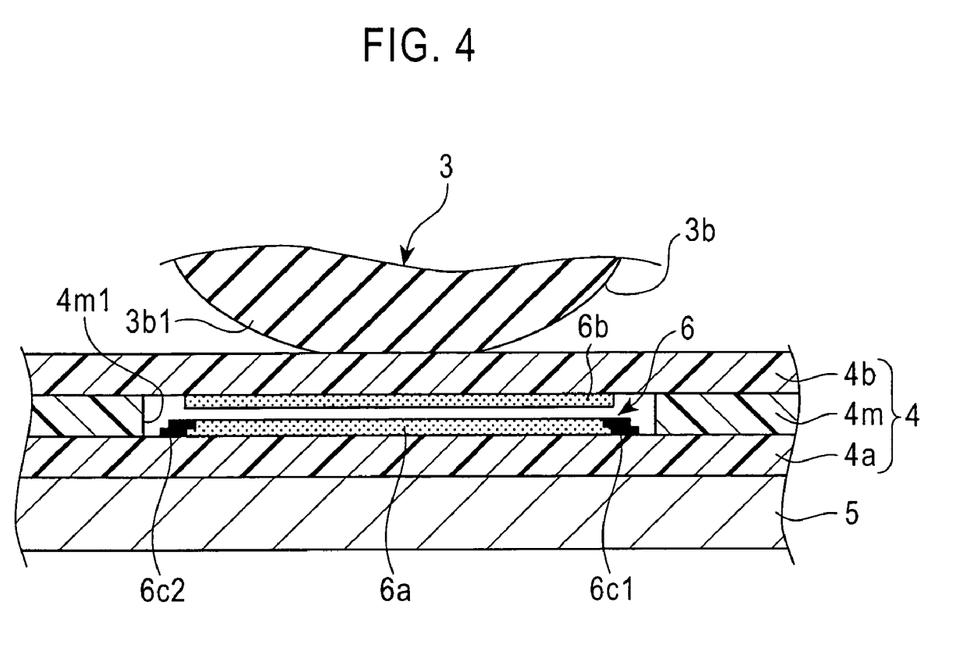
FIG. 4 is a partly enlarged cross-sectional view illustrating a contact.

The elastic supporting member 3 is provided on the detecting substrate 4, and the detecting substrate 4 is provided on a reinforcing member 5. FIG. 4 is a partly enlarged cross-sectional view illustrating a contact. The detecting substrate 4 is layered with a bottom sheet 4a, a top sheet 4b, and a spacer sheet 4m, which are composed of flexible and insulative synthetic resin such as polyethylene terephthalate (PET). The spacer sheet 4m has through holes 4m1 at the positions corresponding to the elastic pushing units 3b. At the positions of these through holes 4m1, resistive elements 6a are provided on the bottom sheet 4a, and low-resistance elements 6b are provided on the top sheet 4b. The resistive elements 6a and the low-resistance elements 6b are arranged so as to be in contact with or be separated from each other. Instead of the spacer sheet 4m, an insulative resin film may be disposed on the bottom sheet 4a and/or the top sheet 4b so as to ensure the spacing between these sheets.

The resistive elements 6a are, for example, carbon films, and are rectangularly patterned. The low-resistance elements 6b are metal films composed of, for example, silver, gold, or copper, and have lower electrical resistance than the resistive elements 6a. The resistive elements 6a are connected to electrode films 6c1 and 6c2 composed of, for example, silver or copper, provided at two opposing ends of the resistive elements 6a. Both the resistive elements 6a and the low-resistance elements 6b may be rectangular or circular. Alternatively, the resistive elements 6a may be rectangular while the low-resistance elements 6b may be circular. In this embodiment, the contacts 6 are composed of the resistive elements 6a and the respective low-resistance elements 6b.

Figure 5:
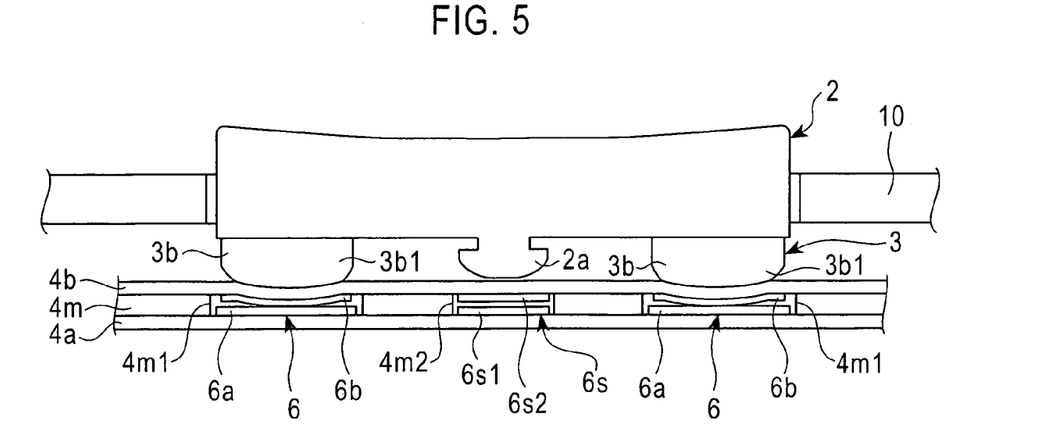
FIG. 5 illustrates the input device when the input device is not operated.
Figure 6:
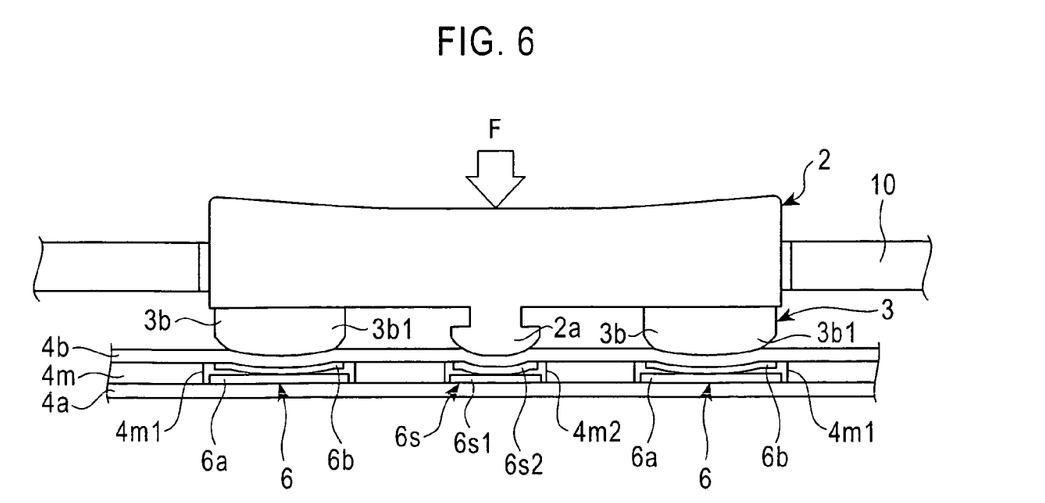
FIG. 6 illustrates the input device when the input device is operated.

FIG. 5 illustrates the input device when the input device is not operated, and FIG. 6 illustrates the input device when the input device is operated. The detecting substrate 4 includes a detecting portion 6s at the position opposing the supporting leg 2a. The detecting portion 6s is the detecting means in this embodiment. The detecting portion 6s may have any shape and any size as long as the detecting portion 6s can detect whether the supporting leg 2a is pressed. For example, as shown in FIGS. 5 and 6, a through hole 4m2 is provided in the spacer sheet 4m, and an electrode 6s1 and an electrode 6s2, each composed of a single conductive film, are provided on the bottom sheet 4a and the top sheet 4b, respectively. Alternatively, a pair of conductive films may be provided on one of the electrodes with a certain space therebetween, and a single conductive film opposing both the conductive films may be provided on the other electrode.

The reinforcing member 5 is composed of, for example, an aluminum plate, and the detecting substrate 4 intervenes between this reinforcing member 5 and the elastic supporting member 3.

As shown in FIG. 1, the reinforcing member 5 has two claws 5c formed by bending the edge portions upward. The claws 5c are inserted into two holes 4c provided in the detecting substrate 4, and further inserted into two catching slits 3c provided in the elastic supporting member 3. Small portions of the ends of the claws 5c are bent outward to catch the elastic supporting member 3. In this manner, the elastic supporting member 3 and the detecting substrate 4 are positioned on the reinforcing member 5.

As shown in FIG. 1, two positioning pins 12 are formed on the bottom surface of a case 10 to assemble the input device 1 in the case 10. The positioning pins 12 protrude from the bottom surface 10b of the case 10 and are inserted into through holes 3d, 4d, and 5d provided in the elastic supporting member 3, the detecting substrate 4, and the reinforcing member 5, respectively. The ends of the positioning pins 12 are disposed in two hollows 11a provided in a base 11 arranged under the reinforcing member 5. Accordingly, the input device 1 in this embodiment can easily be assembled in the case 10 by the positioning pins 12 of a predetermined shape at predetermined positions on the case 10.

In the input device 1, the operating unit 2 is inserted into an opening 10a provided in the case 10 from under the bottom surface 10b of the case 10. The flanges 2b provided on the operating unit 2 then engage with the edges of the opening 10a to prevent the operating unit 2 from coming out of the opening 10a.

In the input device 1, the operating portions 2x1, 2x2, 2y1, and 2y2 of the operating unit 2 partly protrude upward from the opening 10a so that the operating portions 2x1, 2x2, 2y1, and 2y2 can be pressed. For example, when the operating portion 2x1 of the operating unit 2 is pressed, the operating unit 2 inclines and the operating portion 2x1 pushes the corresponding elastic pushing unit 3b. The corresponding pushing portion 3b1 of the elastic pushing unit 3b elastically deforms the detecting substrate 4 to bring the corresponding low-resistance element 6b into contact with the corresponding resistive element 6a. When the operating portion 2x1 is further pressed, the pushing portion 3b1 of the elastic pushing unit 3b is deformed by compression and the detecting substrate 4 further bends. Thus, the contact area between the resistive element 6a and the low-resistance element 6b increases. When the other operating portions 2x2, 2y1, and 2y2 are pressed, the operations are the same as above.

The contact area between the resistive element 6a and the low-resistance element 6b increases with the pushing force of the operating portion 2x1. As the contact area increases, the electrical resistance between the electrode films 6c1 and 6c2 decreases. In other words, the output of the electrical resistance between the electrode films 6c1 and 6c2 varies in an analog fashion as the pushing force of the operating portion 2x1 increases.

As shown in FIG. 5, when the operating unit 2 is not pressed, the low-resistance elements 6b are in contact with the resistive elements 6a at the contacts 6 in the input device 1 according to this embodiment. Meanwhile, the electrode 6s2 is not in contact with the electrode 6s1 at the detecting portion 6s provided in the detecting substrate 4.

As shown in FIG. 6, when the operating unit 2 is pressed or touched from the top by a low-load force F, the operating unit 2 is pressed down to bring the electrodes 6s1 and 6s2 of the detecting portion 6s into contact with each other. When this contact state is detected, the operation of the operating unit 2 is detected.

In this case, the supporting leg 2a is composed of a hard or highly rigid material such as synthetic resin. As a result, when the operating unit 2 is pressed, the detecting substrate 4 is immediately deformed to bring the electrode 6s2 into contact with the electrode 6s1. In contrast, the elastic pushing units 3b are composed of a soft or less rigid material such as rubber. As a result, the amount of deformation of the detecting substrate 4 by the elastic pushing units 3b is less than that of the detecting substrate 4 by the supporting leg 2a. More specifically, even when the electrode 6s2 comes into contact with the electrode 6s1 by the supporting leg 2a, the contact areas between the resistive elements 6a and the low-resistance elements 6b do not significantly increase. Consequently, the operating portions 2x1, 2x2, 2y1, and 2y2 of the operating unit 2 can be further pressed by a certain force to generate analog outputs in response to the resistance varied by the contact areas between the resistive elements 6a and the low-resistance elements 6b.

Figure 7:
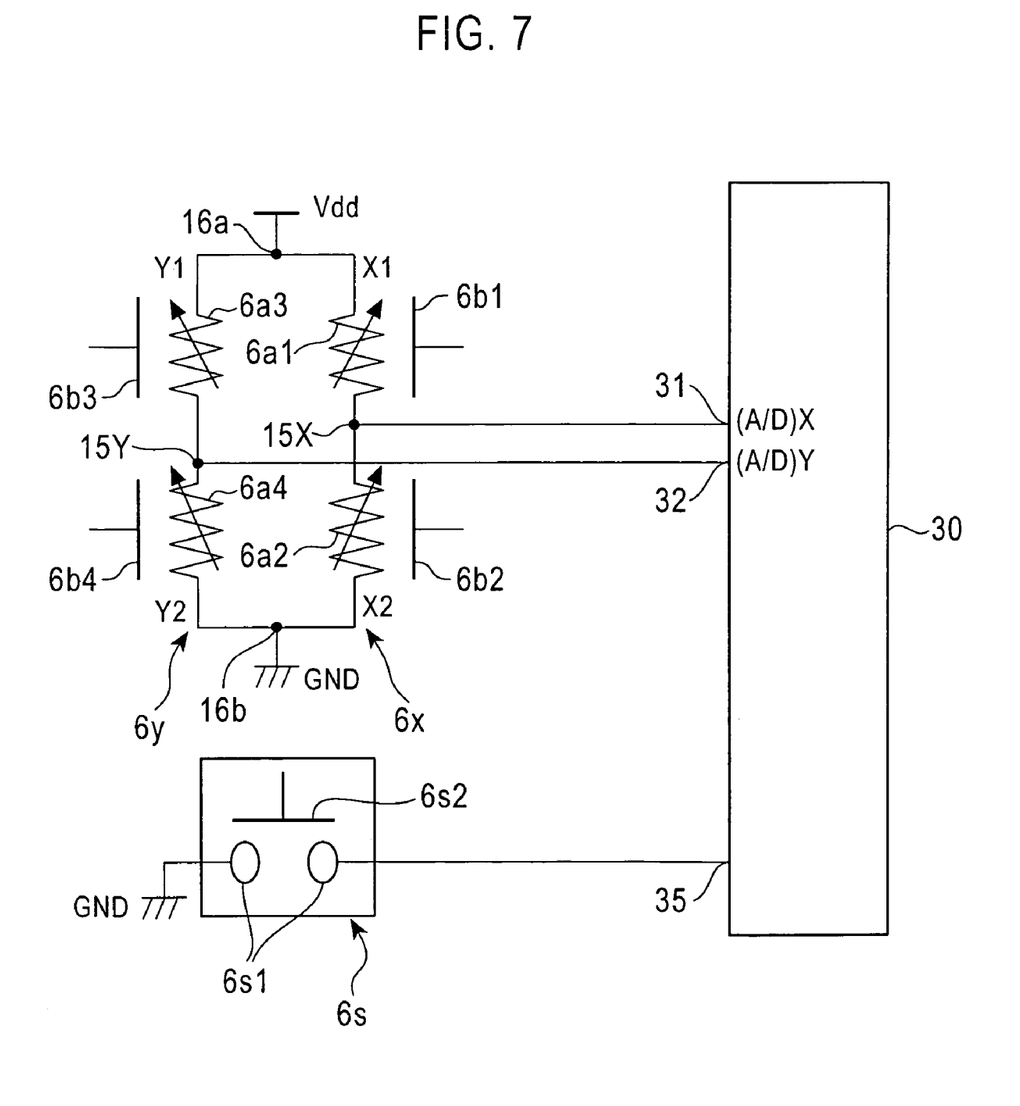
FIG. 7 is a circuit diagram of the input device.

FIG. 7 is a circuit diagram of the input device according to the present invention. Reference numerals X1, X2, Y1, and Y2 indicate detecting portions corresponding to the operating portions 2x1, 2x2, 2y1, and 2y2, respectively. The detecting portion X1 is composed of a resistive element 6a1 and a low-resistance element 6b1, the detecting portion X2 is composed of a resistive element 6a2 and a low-resistance element 6b2, the detecting portion Y1 is composed of a resistive element 6a3 and a low-resistance element 6b3, and the detecting portion Y2 is composed of a resistive element 6a4 and a low-resistance element 6b4.

The resistive element 6a1 of the detecting portion X1 is connected in series to the resistive element 6a2 of the detecting portion X2 to form a resistive-element array 6x, and the resistive element 6a3 of the detecting portion Y1 is connected in series to the resistive element 6a4 of the detecting portion Y2 to form a resistive-element array 6y. The resistive-element array 6x is connected in parallel to the resistive-element array 6y.

Controller 30 controlling the input device 1 is an integrated circuit (IC) including a central processing unit (CPU), a memory, analog-to-digital (A/D) converters, and an input section (input port). The A/D converters convert analog input signals into digital signals and provide the signals for the CPU.

The resistive-element array 6x has an X-output section 15X at the midpoint between the resistive element 6a1 and the resistive element 6a2, and the resistive-element array 6y has a Y-output section 15Y at the midpoint between the resistive element 6a3 and the resistive element 6a4. The voltage output from the X-output section 15X is input to an X-input A/D converter 31 of the controller 30, and the voltage output from the Y-output section 15Y is input to a Y-input A/D converter 32 of the controller 30.

A power-supply voltage Vdd is applied to a junction 16a of the resistive-element array 6x and the resistive-element array 6y connected in parallel. The other junction 16b is grounded.

One end of the electrode 6s1 of the detecting portion 6s is connected to an input section 35 of the controller 30, and the other end of the electrode 6s1 is grounded.

In this input device 1, if the operating unit 2 is left unoperated, i.e. the electrodes 6s1 and 6s2 are kept separated from each other, for a predetermined period, a sleep mode is enabled. In this sleep mode, electricity to the detecting portions X1, X2, Y1, and Y2 is cut to reduce the power consumption of the input device 1. When the operating unit 2 is pressed to bring the electrode 6s2 into contact with the electrode 6s1 during the sleep mode, the voltage at the input section 35 is varied, and the controller 30 detects that the operating unit 2 is operated.

When the operation of the operating unit 2 is detected, the operation mode is switched from the sleep mode to a detection mode. In this detection mode, when any one of the low-resistance elements 6b1, 6b2, 6b3 and 6b4 comes into contact with the corresponding resistive element 6a1, 6a2, 6a3, or 6a4 to vary the resistance, the voltage varies at at least one of the X-output section 15X and the Y-output section 15Y.

The input device of the present invention is not limited to the above-described embodiment. Each of the resistive-element array 6x and the resistive-element array 6y may include three or more resistive elements. Moreover, the input device may have only one resistive-element array and the resistive-element array may include three or more resistive elements. In the above arrangements, voltages are output between those adjacent resistive elements.

Figure 8:
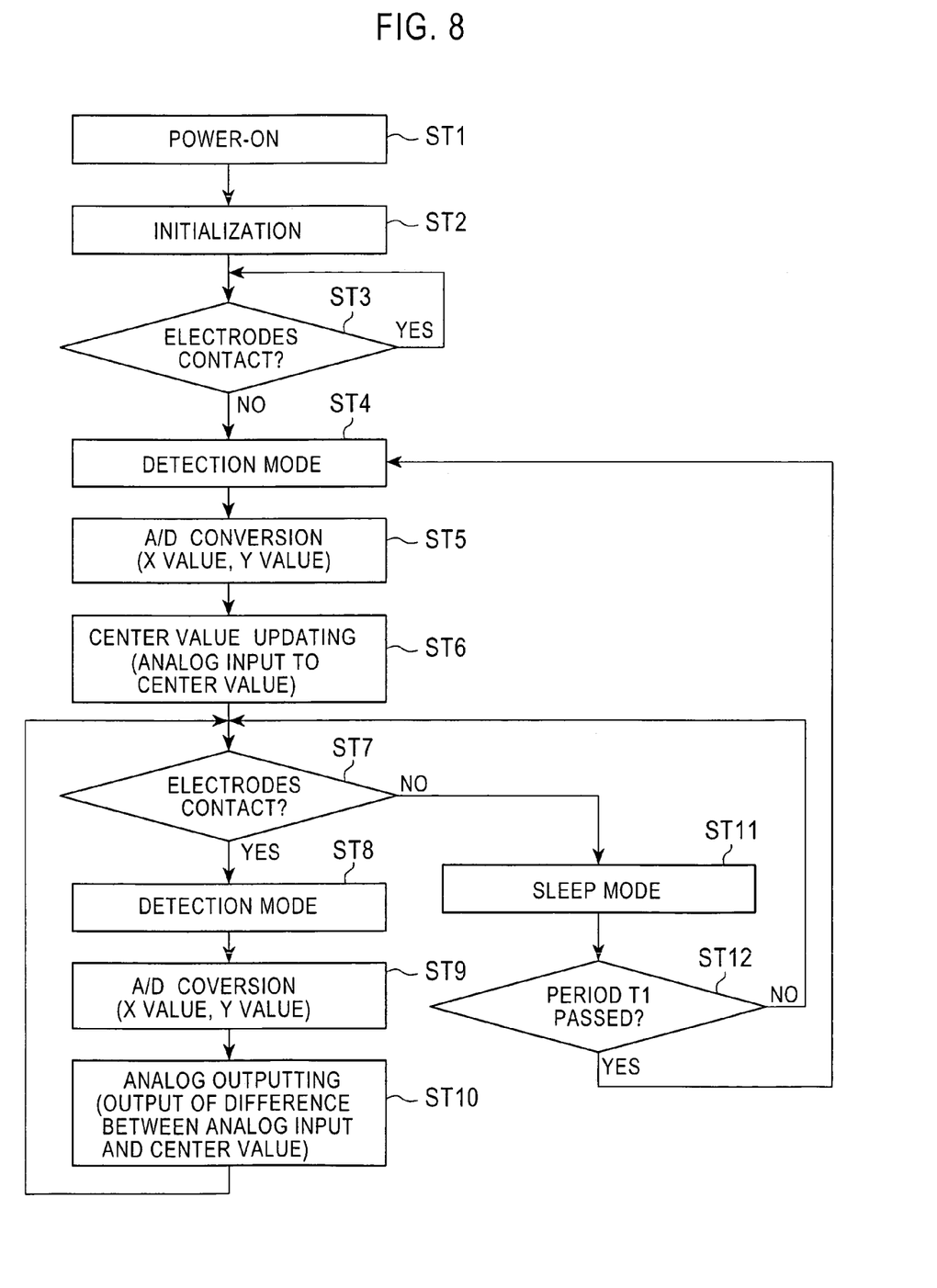
FIG. 8 is a flow chart illustrating a series of operations.

Referring to the flow chart in FIG. 8, a series of operations of the input device 1 will now be described. In FIG. 8, "ST" indicates a step.

When the input device 1 is powered on (ST1), the process proceeds to an initialization step (ST2). While this initialization is performed, it is checked that the electrodes 6s1 and 6s2 of the detecting portion 6s are not in contact with each other (ST3), and then the detection mode is enabled (ST4). In this detection mode, the voltage at the X-output section 15X is sent to the X-input A/D converter 31, and is stored in the controller 30 as the center value of the X-direction output (X-direction reference value). Similarly, the voltage at the Y-output section 15Y is sent to the Y-input A/D converter 32, and is stored in the controller 30 as the center value of the Y-direction output (Y-direction reference value) (ST5, ST6).

The center value of the X direction is defined as the median value of digital values divided into, for example, 128 or 256, in the X-input A/D converter 31. That is to say, when the low-resistance elements are not in contact with the respective resistive elements at any of the detecting portions X1, X2, Y1, and Y2, the voltage at the X-output section 15X is stored in the memory as the center value of the digital values, and the voltage at the Y-output section 15Y is stored in the memory as the center value of the digital values (ST6).

After the center value of the X direction and the center value of the Y direction are updated, it is monitored whether the electrodes 6s1 and 6s2 of the detecting portion 6s come into contact with each other in ST7. If the electrodes 6s1 and 6s2 come into contact with each other (Yes), the detection mode is enabled (ST8). This detection mode is a normal operation mode for monitoring operations at the detecting portions X1, X2, Y1, and Y2.

In the detection mode in ST8, when the operating unit 2 is operated to vary the electric potential of the X-output section 15X and the electric potential of the Y-output section 15Y, the voltages are digitally converted by the X-input A/D converter 31 and the Y-input A/D converter 32 (ST9). The CPU of the controller 30 determines the difference between the digitally converted X-input value and the center value of the X direction, and defines the difference as an analog coordinate-input value in the X direction. Similarly, the CPU determines the difference between the digitally converted Y-input value and the center value of the Y direction and defines the difference as an analog coordinate-input value in the Y direction (ST10).

If the electrodes 6s1 and 6s2 of the detecting portion 6s do not come into contact with each other for a predetermined period in ST7, the sleep mode is enabled to reduce power consumption (ST11). In this sleep mode, when the noncontact state of the electrodes 6s1 and 6s2 of the detecting portion 6s lasts for a predetermined period T1 (ST12), the process returns to the detection mode in ST4 to update the center value of the X direction and the center value of the Y direction with the output from the X-output section 15X and the output from the Y-output section 15Y, respectively. Updating the center values after the sleep mode is enabled allows the input device to cope with changes in the operating environment and the like.

In ST12, if the predetermined period T1 has not elapsed, the process returns to ST7 to perform the same steps as described above.

In this manner, enabling the sleep mode when the operating unit 2 is not operated can reduce the power consumption. Furthermore, if the operating unit 2 is not operated for the predetermined period T1, the center value of the X direction and the center value of the Y direction are regularly updated before the step proceeds to the detecting operation. Therefore, X-Y coordinates can be accurately input even when the resistances of the resistive elements 6a (6a1, 6a2, 6a3, and 6a4) are not exactly the same or the resistances vary in response to temperature changes.

Since the contact-type detecting portion 6s is provided in this embodiment besides the detecting portions X1, X2, Y1, and Y2, the sleep mode can be reliably disabled even when the resistive elements and the respective low-resistance elements are kept in contact with each other while the operating unit 2 is not operated. Moreover, the circuitry can be simplified.

Figure 9:
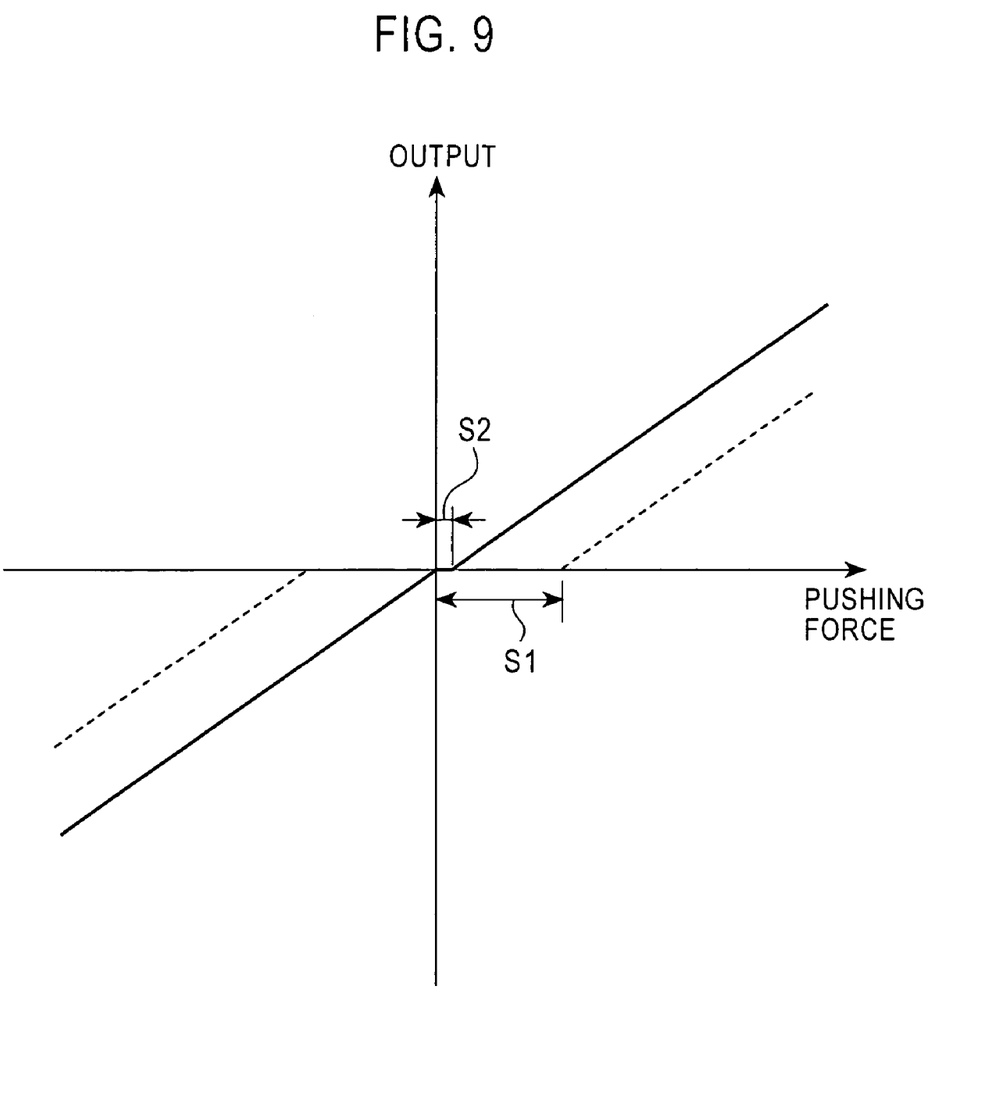
FIG. 9 illustrates the relationship between pushing force and output.

FIG. 9 illustrates the relationship between pushing force (X axis) and output (Y axis) of the input device according to the present invention and a known input device. In the known input device, the resistive elements and the respective low-resistance elements must be separated from each other when the operating unit is not operated. As shown in FIG. 9, this causes a wide dead band S1, indicated by the dashed line. Therefore, the operating unit needs to be pressed by a certain amount of the pushing force or more to generate a certain output. In contrast, in the input device 1 according to this embodiment, the resistive elements 6a and the respective low-resistance elements 6b are in contact with each other even when the operating unit 2 is not operated. As shown in FIG. 9, this causes no dead band or a small dead band S2, indicated by the solid line. Thus, the operability is improved.

Furthermore, with a large dead band, the output angles are disadvantageously biased to the X direction or the Y direction when the pushing force of the operating unit 2 is small. However, the input device 1 according to this embodiment, having no or a small dead band, does not suffer from this problem.

As described above, since the resistive elements 6a and the low-resistance elements 6b are arranged to be in contact with each other when the operating unit 2 is not operated, the through holes 4m1 provided in the spacer sheet 4m shown in FIG. 4 can be expanded, so that the design flexibility is improved. That is to say, in the known input device, the size of the through holes in the spacer sheet needs to be smaller than the areas of the resistive elements or the low-resistance elements for prevention of incorrect inputs, and the noncontact state of the resistive elements and the low-resistance elements needs to be ensured except when the operating unit is operated. However, the input device 1 according to this embodiment does not need to ensure this noncontact state.

The detecting means of the present invention is not limited to the structure including the detecting substrate 4 in which the electrodes oppose each other. The detecting means may use light or magnetism to detect the position of the supporting leg 2a.

What is claimed is:

1. An input device comprising:
    contacts having resistive elements, and low-resistance elements opposite the respective resistive elements;
    an operating unit configured to vary a contact area between the low-resistance elements and the resistive elements in response to an operating pressing force; and
    detecting means for switching between a sleep mode and a normal mode in response to operation of the operating unit, the switching occurring without varying the contact areas, wherein
    when the operating unit is not operated for a predetermined period of time, the detecting means, the output of which is not activated, switches to the sleep mode to reduce power consumption, the low-resistance elements and the respective resistive elements being in contact with each other during the sleep mode; and
    the detecting means switches to the normal mode when the unit is operated so as to vary an analog output signal in response to pressing operations of the operating unit,
    whereby the low-resistance elements and the respective resistive elements are in contact with each other during the sleep mode to reduce a dead band of the analog output signal.

2. The input device according to claim 1, further comprising:
    a supporting leg provided on the operating unit, wherein the detecting means can switch the operation mode in response to the operating force of the supporting leg when the operating unit is pressed.

3. The input device according to claim 2, further comprising:
    elastic pushing units opposing the respective contacts and supporting the operating unit so that the operating unit can be pressed, wherein
    when the operating unit is pressed, outputs at the contacts vary in response to the compressive deforming force of the elastic pushing units; and
    the supporting leg is composed of a harder material than the elastic pushing units.

4. The input device according to claim 2, wherein
    the resistive elements are disposed around a virtual axis extending through the center of the supporting leg in two orthogonal directions with a space therebetween; and
    the operating unit operates the low-resistance elements opposing the respective resistive elements.

5. The input device according to claim 1, further comprising:
    a controller monitoring if the detecting means is not activated in an initialization step after power activation and storing a center value of an output value corresponding to the contacts, wherein
    when the sleep mode lasts for a predetermined period of time, the controller updates the center value.

* * * * *